United States Patent [19]
LaMarca, II et al.

[11] Patent Number: 5,100,724
[45] Date of Patent: Mar. 31, 1992

[54] FLAME AND PUNCTURE RESISTANT FABRIC SHEET MATERIAL AND METHOD OF MANUFACTURING SAME

[75] Inventors: Louis J. LaMarca, II, Westminster; Bruce A. Corley, Newton Corner, both of Mass.; James F. Hayes, Sr., Mason, N.H.

[73] Assignee: The Haartz Corporation, Acton, Mass.

[21] Appl. No.: 628,404

[22] Filed: Dec. 17, 1990

Related U.S. Application Data

[63] Continuation of Ser. No. 411,052, Sep. 22, 1989, Pat. No. 4,980,228.

[51] Int. Cl.⁵ .................................................. B32B 5/00
[52] U.S. Cl. ........................................ 428/300; 156/148; 428/284; 428/285; 428/286; 428/421; 428/920
[58] Field of Search ............... 428/284, 285, 286, 421, 428/300; 156/148

[56] References Cited

U.S. PATENT DOCUMENTS

| | | | |
|---|---|---|---|
| 4,062,993 | 12/1977 | Seward | 428/234 |
| 4,378,403 | 3/1983 | Hotcharian | 428/251 |
| 4,500,592 | 2/1985 | Lee et al. | 428/251 |
| 4,622,253 | 11/1986 | Levy | 428/234 |
| 4,743,495 | 5/1988 | Lilani et al. | 428/234 |
| 4,851,274 | 7/1989 | D'Elia | 428/296 |

OTHER PUBLICATIONS

Souba, Jane T., "Missing the Bus", Industrial Fabric Products Review, Aug. 1989, pp. 38–40.

Primary Examiner—James J. Bell
Attorney, Agent, or Firm—Richard P. Crowley

[57] ABSTRACT

A flame- and puncture-resistant composite fabric sheet material suitable for use for example as an upholstery cover over a urethane or other foam seat cushion and the method of producing the fabric sheet material. The fabric sheet material comprises a thermoplastic polymer layer, such as a vinyl layer, optionally top coated with an abrasion-resistant layer and which thermoplastic layer is bonded to a synthetic fiber, non-woven layer which layer has been needle punched through a metal foil material and a fiberglass scrim layer. The method includes needle punching a synthetic fibrous sheet material through adjacent layers of a metal foil material and a fiberglass sheet, such as aluminum, and extruding a molten vinyl film onto the fibers of the non-woven layer and optionally topcoating the vinyl film to provide a composite sheet material having high flame and puncture resistance.

19 Claims, 1 Drawing Sheet

FLAME AND PUNCTURE RESISTANT FABRIC SHEET MATERIAL AND METHOD OF MANUFACTURING SAME

This is a continuation of copending application Ser. No. 07/411,052 filed on 9/22/89, is now U.S. Pat. No. 4,980,228.

BACKGROUND OF THE INVENTION

Plastic coated fabrics are typically employed in a wide variety of uses, such as, but not limited to, fabric covering for furniture, and more particularly, for covering foam articles, such as seat and back cushions. A particular application of plastic coated fabrics comprises the use of a vinyl coated fabric on a woven polyester or polyester/cotton fabric for use as a upholstery fabric on the foam cushions used in a school bus. Such a vinyl coated fabric must be designed to meet Federal flammability requirements, Federal Motor Vehicle Safety Standard (FMVSS) 302. This Federal regulation is not a severe test and comprises a horizontal type flame test. In addition, there is a vertical type burn test, Federal Test Method (FTM) 5903, which is more stringent than the FMVSS-302 test.

Another test of a more rigorous nature has been developed which is known as the Boston Bag Test and which comprises the stuffing of a standard paper bag with newspapers, placing the bag on a seat cushion and igniting the bag. In order to pass the Boston Bag Test, the upholstery fabric employed must not be ignited by the bag or permit ignition of the urethane foam cushion used in the school buses. This test has shown that the standard school bus upholstery fabric does not prevent a flame from penetrating the fabric and igniting the urethane foam cushion employed in upholstery. The flame initiated via the Boston Bag Test burns through the standard upholstery fabric and propagates until the entire bus is engulfed in flames and smoke. The standard seat upholstery fabric employed has only fair puncture resistance, thus reducing the life and durability in the field of the foam cushions covered with the upholstery fabric. School bus upholstery is subject to extreme, rugged wear and vandalism.

It is therefore desirable to provide a new and improved flame- and puncture-resistant composite fabric sheet material which will be particularly suitable for use as a surface covering, that is, an upholstery covering, particularly for foam type cushions used in a school bus, and which composite fabric sheet material meet and exceeds the Federal flammability standards and the standards of the Boston Bag Test.

SUMMARY OF THE INVENTION

The invention relates to a flame and puncture-resistant composite fabric sheet material, to foam structures covered by the said sheet material, the use of the sheet material as a covering, particularly for foam structures, like seat cushions, and to a method of producing the fabric sheet material.

The invention relates to a flame- and puncture-resistant composite fabric sheet material which is designed to provide an effective flame barrier to external flame and further to provide a product with significantly superior puncture resistance that will enable the product to last longer in use in the field, particularly when employed as an upholstery fabric covering, and more particularly as an upholstery fabric covering over a foam cushion, such as used on public vehicles, such as school buses.

The invention comprises in one embodiment a needle punched, non-woven, substrate sheet material which includes adjacent layers of a metal foil and a glass fiber sheet material. The resultant composite is a sandwich with the glass fiber sheet material and the metal foil mechanically entangled with the non-woven fibers on either side of the metal foil and glass fiber sheet material and with one side having a relatively thick layer of the non-woven fibers as the back side and the top side having a relatively thin layer of non-woven fibers.

The invention also comprises a composite fabric sheet material where the non-woven fiber substrate contains a layer of a thermoplastic polymer which adheres to the top side of the substrate, such as a substrate coated with a thin layer of vinyl film, either a solid or foam layer, and then optionally coated with a thin, abrasion-resistant topcoat layer. The resulting composite fabric sheet material is then suitably employed as an upholstery fabric, such as on a foam article, like a urethane or neoprene foam, used for a seat or other cushion purposes.

The invention also comprises the method of producing the needle punched, non-woven substrate and the composite fabric sheet material wherein a glass fiber sheet material and a metal foil sheet material are placed on top of a non-woven fabric sheet material and the non-woven substrate sheet material then needle punched from one or both sides through the glass fiber and metal foil sheet material to provide the needle punched, non-woven substrate that is later coated with a thermoplastic layer to form the composite fabric sheet material.

In particular, the method includes using the non-woven substrate sheet material as a carrier sheet material and placing the glass fiber sheet material on top thereof and then placing the metal foil directly on top of the glass fiber sheet material, and needle punching or otherwise forcing the fibers of the non-woven substrate through the glass fiber and metal foil sheet materials to provide the sandwich type construction with the glass fiber and metal foil securely bonded together and mechanically entangled with the non-woven fibers of the non-woven substrate. The method then includes bonding a thermoplastic polymer to the top, non-woven surface of the non-woven substrate sheet material containing the metal foil and glass fiber sheet material, such as for example, by die extruding a molten film of vinyl or coating a vinyl plastisol film onto the relatively thin layer of the non-woven fibers and passing the molten film, together with the non-woven substrate, through nip rollers. Optionally, a thin top layer of an abrasion-resistant coating material is coated onto the vinyl film. The resulting composite fabric sheet material may then be suitably employed as a fabric covering.

The non-woven fabric sheet material employed in the practice of the invention may be comprised of a variety of fibers, but typically employs flame-resistant type fibers, such as synthetic fibers, to include but not be limited to flame-resistant polyester fibers, modacrylic fibers and aramid fibers, like nylon, and blends thereof. Other synthetic fibers and combinations may also be employed; however, typically the fibers employed are fiber blends wherein the polyester represents more than 50% of the blend, while the more expensive modacrylic, particularly the aramid fibers, are employed in limited amounts due to their cost or the aramid fiber complete eliminated. For example, the aramid fibers are generally not necessary, but could be used at up to about 5% by volume of the fiber blend. A combination of fibers is used in the non-woven substrate in order to achieve an optimum balance of flame resistance, cost and performance.

The glass fiber sheet material employed in the practice of the invention may be comprised of a woven or non-woven glass fiber sheet material, such as a glass fiber, non-woven tissue material or a woven, glass fiber scrim material. It has been found that the glass fiber sheet material enhances the flame retardancy of the substrate and resulting composite fabric, since it does not support a flame, and in addition, the glass fiber sheet material serves as a flame barrier and enhances puncture resistance. It has been found that a closely woven, glass fiber sheet material is preferred, since the puncture resistance, tensile strength, tear strength and other properties can be designed depending on the weight and count of the glass fiber sheet material woven construction. In some cases, a glass fiber, non-woven glass tissue material may be employed, but only if puncture-resistance and mechanical strength of the composite fabric is not of importance or necessary.

It has further been discovered that by employing a non-woven, glass fiber sheet material, some of the inherent strength properties of the glass fiber non-woven sheet material may be lost or reduced due to damage caused by needle impingement during the needle punching operation wherein the non-woven substrate is needle punched through the glass fiber sheet material. It has been found that the employment of a polymeric coating on the glass fiber sheet material, such as the employment of a fluorocarbon polymer coating on the glass fiber sheet material, provides enhanced resistance to fiber breakage during the needle punching operation. The use of a coating to enhance fiber strength is more cost effective than increasing size, count and weight of the glass fiber in the sheet material. The amount of the coating of the polymeric material on the glass fiber sheet material may vary, for example, from 1% to 12%. A variety of polymers may be employed to enhance the mechanical strength and to reduce glass fiber breakage. However, it has been found that fluorocarbon polymers, particularly a Teflon® type polymer coating (Teflon® is a registered trademark of E.I. Du Pont de Nemours & Co.), is effective in the amount of from about 4% to 8% by weight of the glass fiber sheet material.

The metal foil employed in the practice of the invention may comprise any thin, metal foil type material or combination, and more particularly comprises an aluminum foil, for example, having a thickness of about 0.2 to 2 mils or more. The metal foil provides a flame barrier and also serves as a heat sink in the resulting composite fabric sheet material. The metal foil dissipates the heat and helps therefore to prevent shrinkage of the non-woven fabric and the exposure of the underlying foam of a foam upholstery cushion to the open flame. The metal foil is used in combination with and typically directly adjacent the woven glass fiber sheet material, so that the non-woven fibers of the non-woven substrate are punched directly through both the glass fiber sheet material and the metal foil during the same operation. Generally, the aluminum foil is placed on the bottom of the composite fabric sheet material, that is, adjacent to the relatively thin layer of the non-woven fibers and the glass fiber sheet material on top thereof and adjacent the relatively thick layer of the non-woven fibers. However, if desired, the positions may be reversed and one or more layers of metal foil and one or more layers of glass fiber sheet material may be employed in various amounts in the composite fabric sheet material of the invention.

The needle punched, non-woven substrate of the invention is coated on one or even both surfaces by one or more layers of a thermoplastic polymer, such as a vinyl polymer, like polyvinyl chloride. The vinyl polymer may be applied as a plastisol coating, or more typically as illustrated in the invention, the vinyl polymer is die extruded and coated to form a molten sheet of vinyl film, the molten film placed on top of the relatively thin layer of the non-woven substrate fibers and passed through a pair of nip rollers, such as a rubber coated roller and an embossed steel roll, to force the molten vinyl film into the top surface of the non-woven fibers and optionally to impart a desired imitation grain effect or other surface design on the top surface of the vinyl layer. While a thermoplastic polymer such as a vinyl layer is preferred, other thermoplastic polymers may be employed as the coating on the needle punched, non-woven substrate. Optionally, as desired, a thin layer (0.1 to 1 mil) of an abrasion-resistant top coat may be applied to the gravure coated surface of the vinyl layers, such as a urethane, polyvinyl chloride or polyvinyl chloride/acrylic top coat to impart abrasion resistance to the composite fabric sheet material.

The composite fabric sheet material may be employed in a wide variety of uses, and typically is employed as a covering of foam cushions, typically urethane foam cushions employed in school buses and in other operations where high puncture and flame resistance are desired. It is recognized that the composite fabric sheet material of the invention will have applications in a wide variety of fields where a highly flame- and puncture-resistant fabric sheet material is desired, such as aircraft and institutional furniture covering uses.

The composite fabric sheet material of the invention has a total gauge of about 60 to 100 mils wherein the top coating may range from about 0.1 to 1.5 mils, the thermoplastic coating layer would range from about 10 to 50 mils, for example, 18 to 35 mils, the relatively thick, non-woven fibrous layer would range from about 10 to 100 mils, for example, 50 to 60 mils, the glass fiber sheet material would range from about 5 to 30 mils and typically, the woven material from 12 to 24 mils, and the metal foil would range from about 0.2 to 2 mils or more, typically 0.5 to 1 mil.

The needle punched, non-woven substrate and the resulting composite fabric sheet material of the invention provides for an integral composite sheet material that combines aesthetic appearance and good tailorability, that is, ease of seat and upholstery manufacturing with superior resistance to flame and puncture. The composite fabric sheet material avoids the disadvantages of prior art techniques wherein in order to obtain fire block or a flame-resistant fabric, a high percentage of very expensive aramid fibers, like Nomex® fiber (a trademark of E.I. Du Pont de Nemours & Co.), must be employed in amounts over 5% to 50% or where a separate layer of a coated fiberglass must be employed. The substrate fabric and the method of the invention avoid the extra handling of the prior art during fabrication, for example, of an upholstery fabric, such as a seat cushion, and avoid the considerable extra cost associated with the need to put in aramid fibers in separate operations.

The invention will be described for the purposes of illustration only in connection with certain embodiments; however, it is recognized that various changes, modifications, improvements and additions may be made to the invention as illustrated by persons skilled in the art, all falling with the spirit and scope of the invention.

DESCRIPTION OF THE INVENTION

Figure 1:
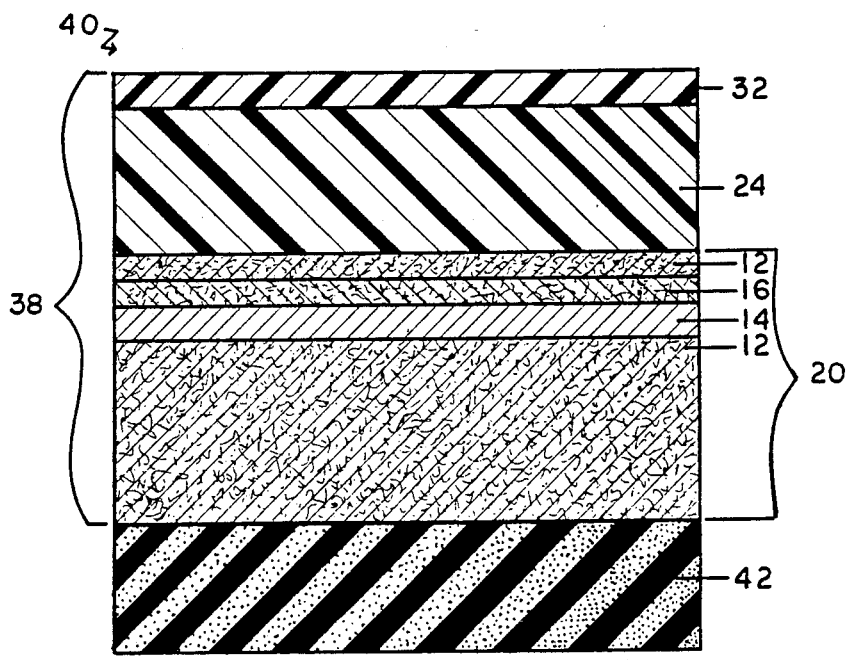
FIG. 1 is an enlarged, sectional, illustrated view of a composite sheet fabric of the invention as an upholstery fabric on a foam cushion.

FIG. 1 shows a foam seat cushion 40 composed of an open cell urethane foam 42 which has been covered by a composite fabric sheet material. The sheet material 20 includes an abrasion-resistant top coating 32, for example, of a polyvinyl chloride/acrylic polymer, at 0.25 ounces per square yard covering a PVC extruded film 24, at about 18 ounces per square yard which film 24 is securely bonded to a non-woven fiber substrate comprised of non-woven fibers 12. The non-woven fiber 12 may include, for example, a blend of about 60% polyester, 35% modacrylic and 5% aramid fibers which blend constitutes a flame-resistant blend. The fibers extend through a tightly woven glass fiber sheet material 16 which has been coated with a fluorocarbon resin, such as for example, a fiberglass woven sheet material, the fiberglass material 32×28 coated with 6% Teflon® and an aluminum foil film material 14 of approximately 0.7 mils. The non-woven fibers 12 form a relatively thin top layer to which layer 24 is bonded. The fiber 12 extends through the woven glass fiber sheet material 16 and the aluminum foil 14 to form a non-woven fiber back coat of about 0.5 ounces per square yard. The aluminum foil 14 comprises about 1.5 ounces per square yard, the fiberglass sheet material 16 comprises 2.75 ounces per square yard and the non-woven, relatively thick back fiber layer 12 ranging from about 3.0 to 5.0 ounces per square yard.

Figure 2:
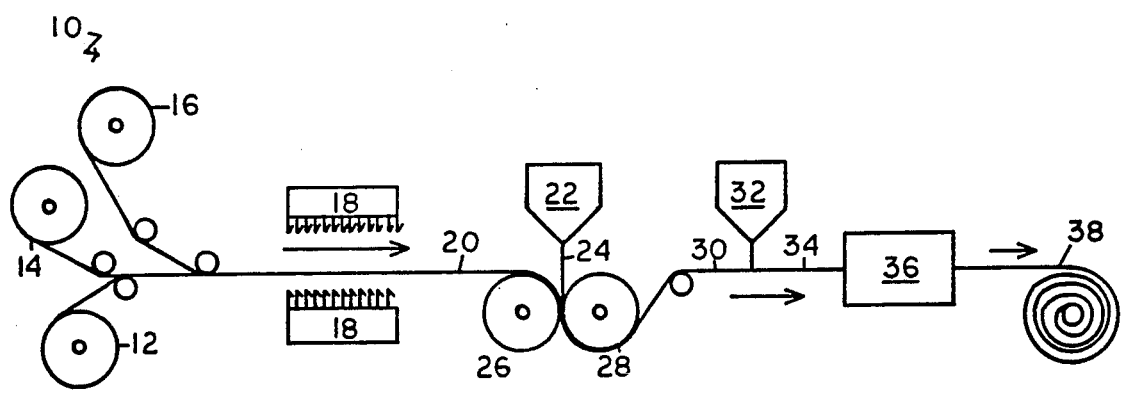
FIG. 2 is a schematic illustration of a method of producing the needle punched, non-woven substrate and the composite fabric sheet material of the invention.

FIG. 2 is a schematic illustration of the method 10 of producing the new, non-woven substrate and the composite fabric sheet material of the invention 40 which includes providing a non-woven substrate material 12, an aluminum foil 14 and a woven glass fiber sheet material 16 and employing the non-woven substrate as a carrier sheet and placing the aluminum foil 14 on top of the non-woven sheet 12 and the woven glass fiber sheet 16 on top of the aluminum foil 14, and thereafter needle punching 18 to provide for a composite, sandwich type, non-woven substrate 20 wherein the non-woven fibers are mechanically entangled and penetrate through both the aluminum foil 14 and the woven glass fiber sheet 16 and extend to the opposite side of the woven glass fiber sheet 16. The substrate 20 is then passed over a rubber roller 28 in close association with a steel grain roll 26, while a vinyl film 24 is extruded from a die 22 into the nip of the rollers 26 and 28 to provide a vinyl film coating 24 on the substrate 20. Thereafter, a thin, abrasion-resistant top coat layer, for example, a water-based or solvent-based urethane or PVC/acrylic layer, is coated on to the top surface of the vinyl coating 24 as a top coat 32 which is by a gravure roller or other means. The material is then passed through an oven 36 to fuse the vinylfilm 24 to provide a composite fabric sheet material 38 of the invention.

The composite fabric sheet material so produced and as illustrated in FIGS. 1 and 2 meets and exceeds the Federal 5903 flammability specifications and the Boston Bag Test specifications. Furthermore, it has been found that such composite fabric sheet material as described and illustrated has superior puncture resistance, so that during puncture resistance tests between a sample material without the employment of the woven glass sheet material and the aluminum foil, which test employs a sharp metal point, increased the puncture resistance from 5 pounds wherein the fabric did not include the woven fiberglass and aluminum foil sheet to 30 pounds, a significant increase in puncture resistance.

What is claimed is:

1. A flame-resistant composite fabric sheet material for use as a surface covering and which fabric sheet material comprises:
   a) a synthetic, non-woven, flame-resistant, fibrous sheet material,
   b) a metal foil sheet material to impart heat sink and flame-resistant properties to the fabric sheet material;
   c) a glass fiber sheet material to impart flame barrier properties to the fabric sheet material;
   d) the synthetic, non-woven fibers of the fibrous sheet material needle punched and mechanically extending through both the glass fiber and metal foil sheet materials to form a back layer of synthetic, non-woven fibers on one surface and to form a top layer of said non-woven fibers on the opposite surface;
   e) a top layer of a thermoplastic polymer bonded to the top non-woven, fibrous sheet material on the one surface; and
   f) optionally an abrasion-resistant top coating layer on the thermoplastic polymer layer, the composite fabric sheet material meeting the requirements of Federal Test Method 5903 and the Boston Bag Test.

2. The material of claim 1 wherein the fibrous sheet material comprises a mixture of synthetic fibers composed of polyester and modacyrlic fibers.

3. The material of claim 1 wherein the metal foil material is an aluminum foil sheet material.

4. The material of claim 1 wherein the glass fiber sheet material contains a fluorocarbon coating thereon to increase the resistance to glass fiber breakage.

5. The material of claim 1 wherein the thermoplastic polymer material comprises a vinyl polymer.

6. The material of claim 1 wherein the metal foil material has a thickness of about 0.5 to 2 mils, and the glass fiber sheet material has a thickness of about 10 to 30 mils.

7. The material of claim 1 wherein the flame-resistant, fibrous sheet material consists essentially of a mixture of polyester and modacrylic fibers with the polyester fibers more than about fifty percent by volume of the fibers and the mixture containing less than about five percent by volume of aramid fibers.

8. The material of claim 1 wherein the glass fiber sheet material comprises a non-woven glass fiber sheet material.

9. A foam covered article which comprises a foam, the foam covered with the fabric material of claim 1.

10. A substrate material suitable for use in preparing flame-resistant fabric sheet material, which substrate material comprises:

a) a synthetic, non-woven, flame-resistant fibrous sheet material;
b) a metal foil sheet material; and
c) a glass fiber sheet material, the synthetic, non-woven fibers needle punched and mechanically extending through both the metal foil and glass fiber sheet materials and secured thereto to form a layer of the synthetic fibers of the non-woven sheet material on one surface and a layer of non-woven fibers on the opposite surface.

11. The substrate of claim 10 wherein the metal foil sheet material comprises an aluminum foil sheet material.

12. The substrate of claim 10 wherein the glass fiber sheet material comprises a non-woven glass fiber sheet material.

13. The substrate of claim 10 wherein the flame-resistant fiber sheet material comprises a mixture of polyester and modacrylic fibers, with the polyester fibers having more than about fifty percent by volume of the mixture and the mixture containing less than about five percent of aramid fibers.

14. A method of producing a flame-resistant composite fabric sheet material suitable for use as a surface covering, which method comprises:
a) providing a glass fiber sheet material, a metal foil sheet material and a synthetic, non-woven, fibrous sheet material;
b) needle punching the fibers of the fibrous sheet material through both the metal foil sheet material and glass fiber sheet material to provide a sandwich-type structure wherein the glass fibers and metal foil are needle punched through and mechanically entangled with the non-woven fibers so as to form a back layer of non-woven fibers on one surface and a top layer of non-woven fibers on the opposite surface;
c) applying to the top surface of the needle punched, non-woven, fibrous sheet material a layer of a thermoplastic polymer to bond the thermoplastic polymer to the top surface; and
d) optionally coating an abrasion-resistant polymer on the thermoplastic polymer layer.

15. The method of claim 14 which includes extruding a molten layer of a thermoplastic polymer and applying the molten thermoplastic layer to the top surface of the non-woven, fibrous sheet material to form a top thermoplastic polymer layer.

16. The method of claim 14 wherein the non-woven fibrous sheet material consists essentially of a mixture of modacrylic and polyester fibers.

17. The method of claim 14 wherein the glass fiber sheet material contains a fluorocarbon coating thereon to increase the resistance of the glass fibers to breakage by needle punching.

18. The method of claim 14 which includes needle punching the fibers of the fibrous sheet material from both sides of the fibrous sheet material.

19. The composite fabric sheet material produced by the method of claim 14.

* * * * *